W. EVANS.
MACHINE FOR FORMING SPRING EYES.
APPLICATION FILED AUG. 22, 1919.
1,339,443.
Patented May 11, 1920.
7 SHEETS—SHEET 1.
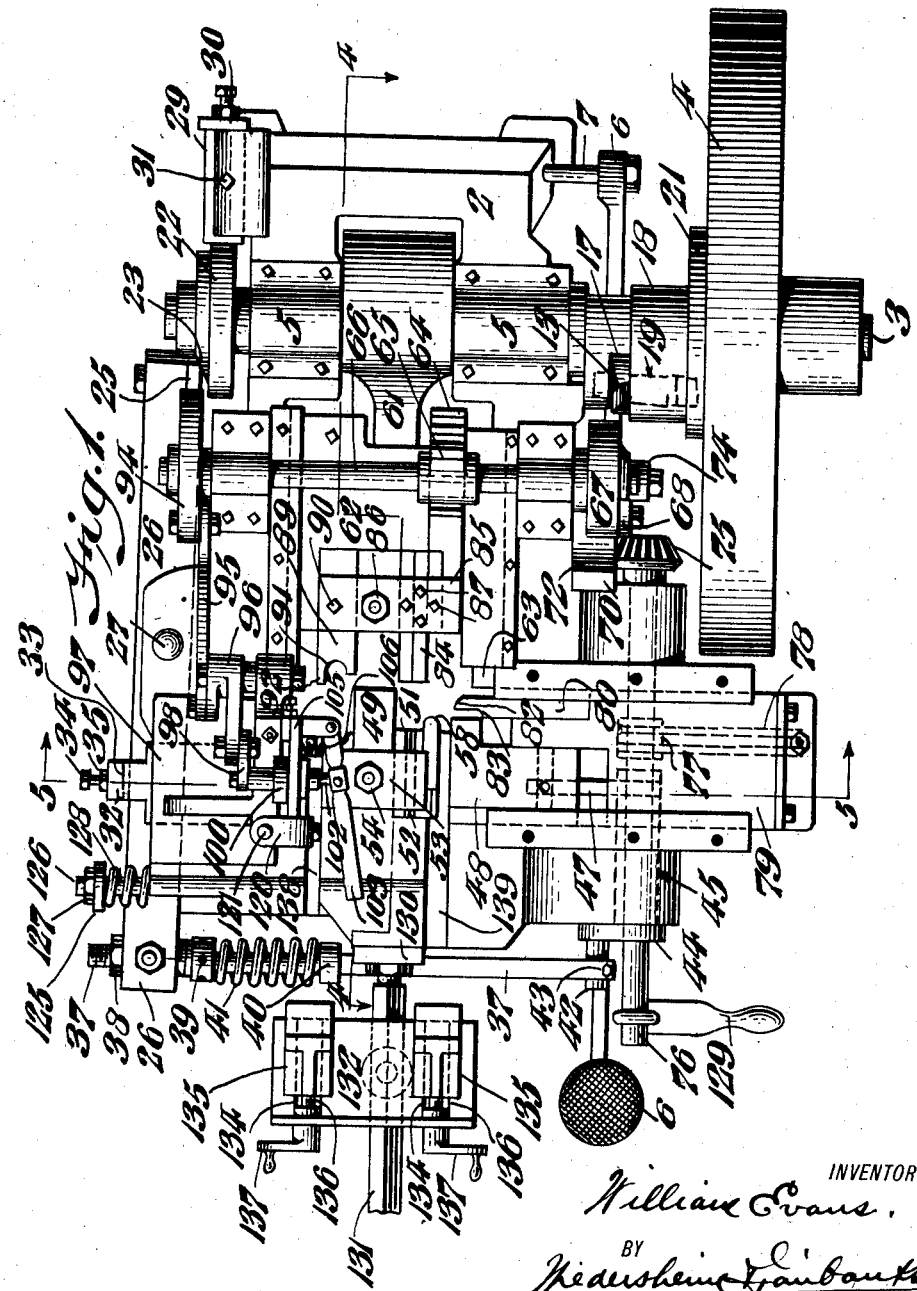
INVENTOR
William Evans.
BY
ATTORNEYS.

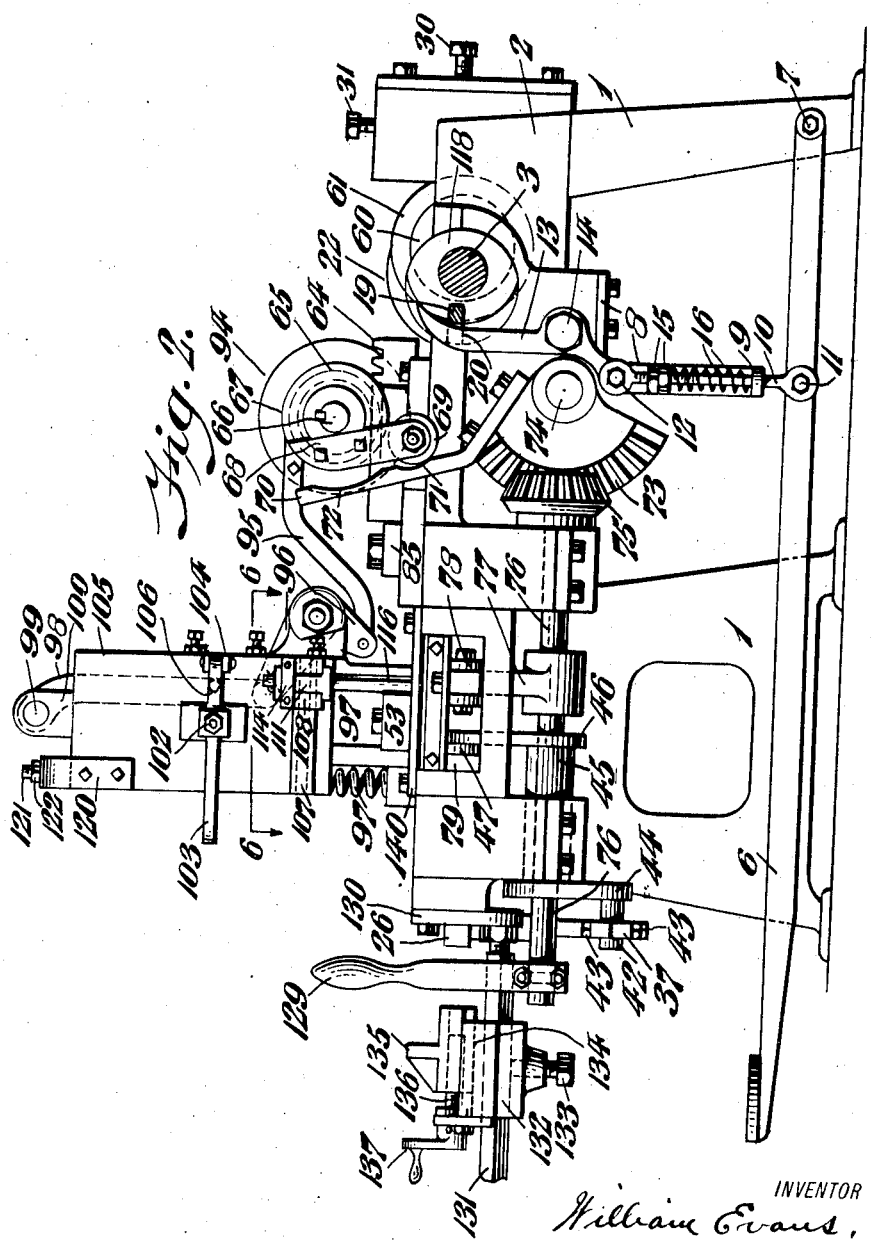

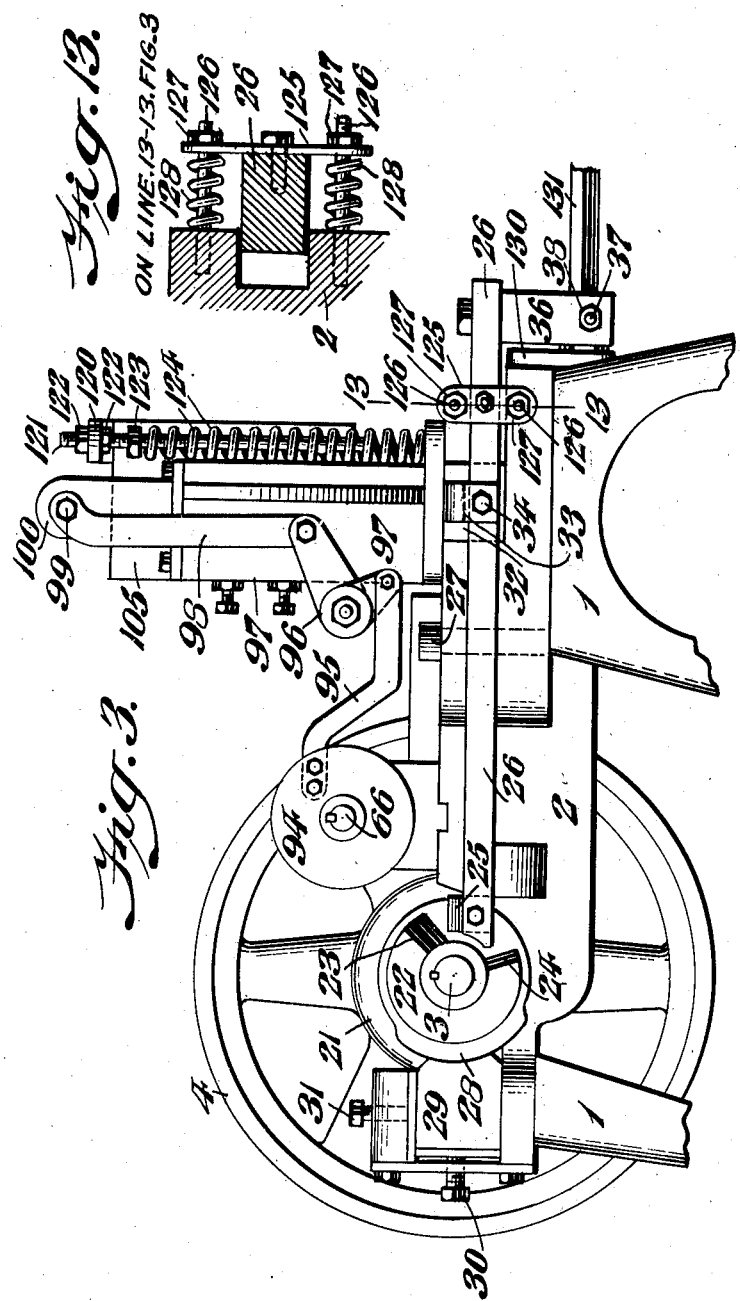

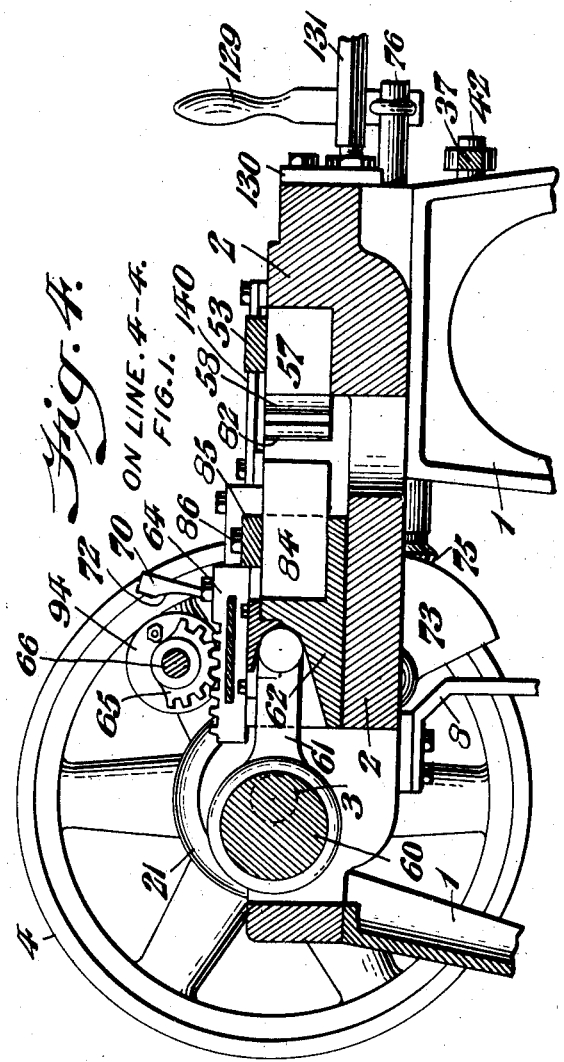

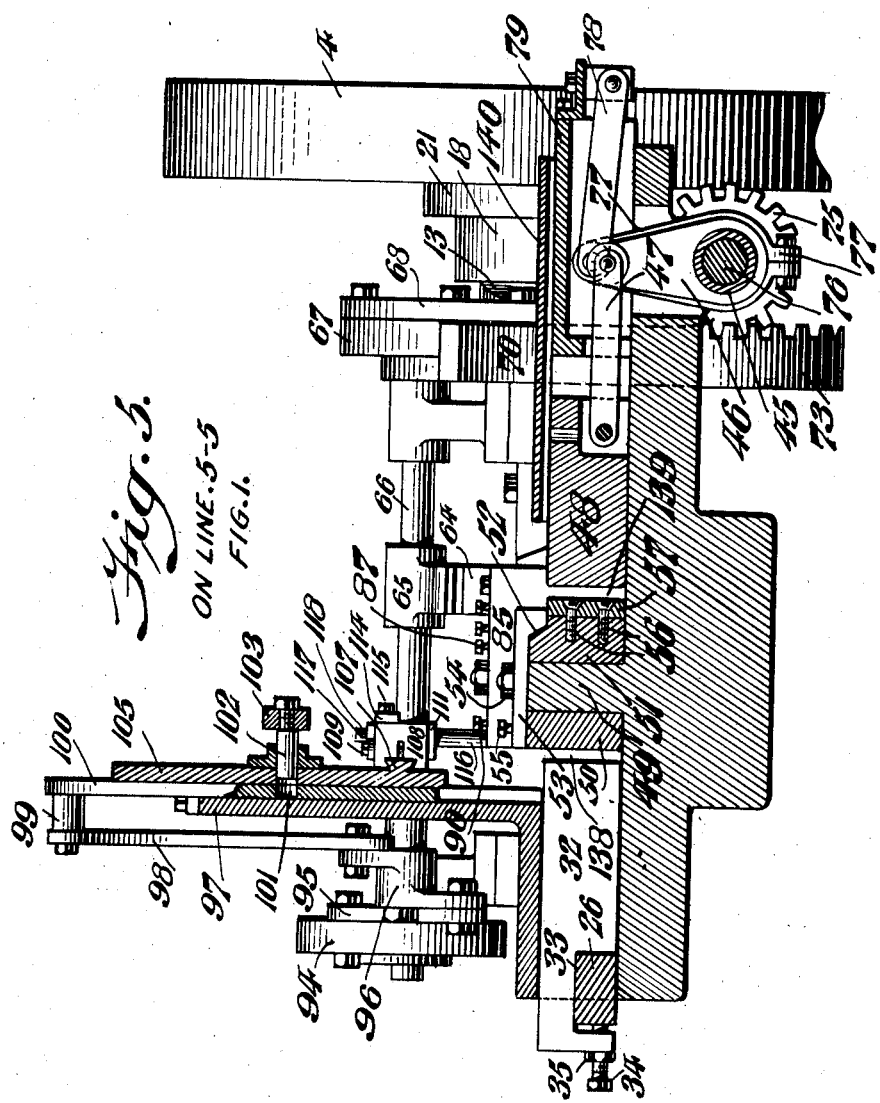

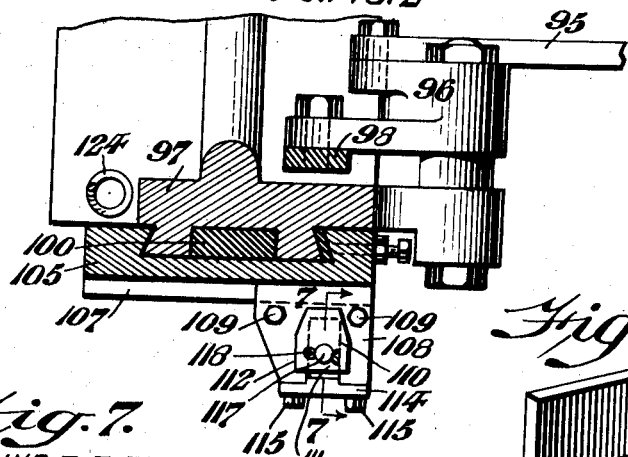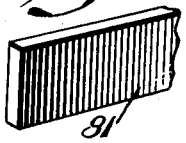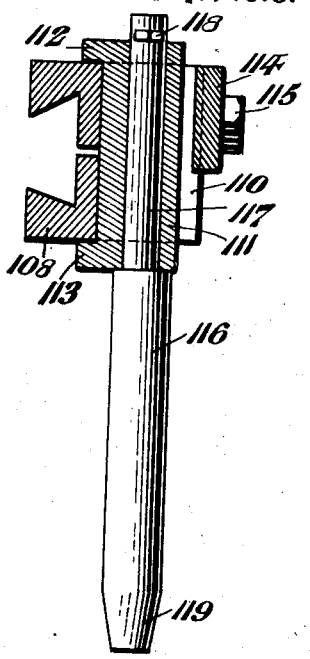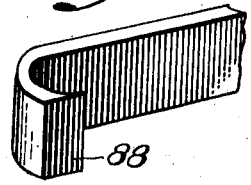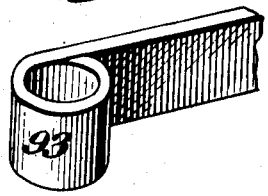

W. EVANS.
MACHINE FOR FORMING SPRING EYES.
APPLICATION FILED AUG. 22, 1919.
1,339,443.
Patented May 11, 1920.
7 SHEETS—SHEET 7.
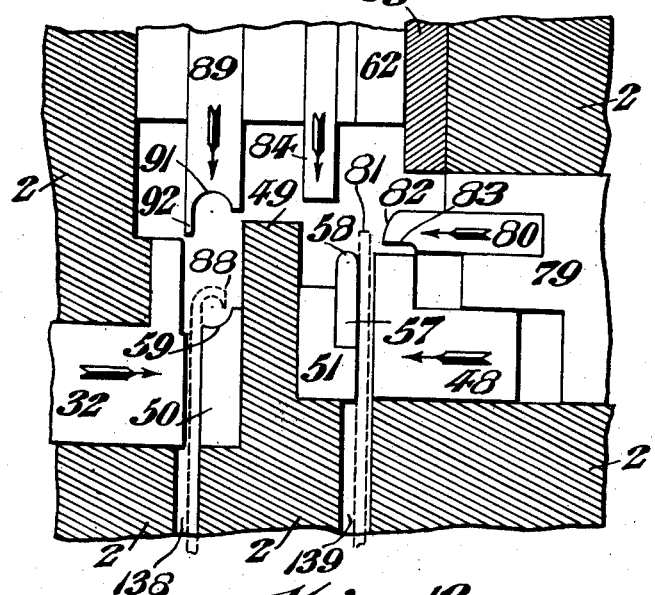
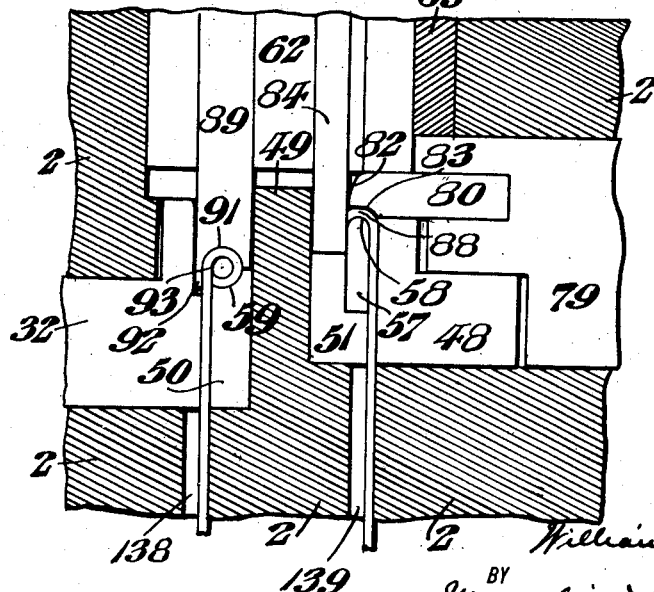
INVENTOR
William Evans.
BY
Wiedersheim Fairbanks
ATTORNEYS.

UNITED STATES PATENT OFFICE.

WILLIAM EVANS, OF PHILADELPHIA, PENNSYLVANIA, ASSIGNOR TO JOHN EVANS' SONS, OF PHILADELPHIA, PENNSYLVANIA, A FIRM COMPOSED OF WILLIAM EVANS, ROBERT EVANS, AND JOHN H. EVANS.

MACHINE FOR FORMING SPRING-EYES.

1,339,443.

Specification of Letters Patent. Patented May 11, 1920.

Application filed August 22, 1919. Serial No. 319,070.

*To all whom it may concern:*

Be it known that I, WILLIAM EVANS, a citizen of the United States, residing in the city and county of Philadelphia, State of Pennsylvania, have invented a new Machine for Forming Spring-Eyes, of which the following is a specification.

In prior eye making machines, for forming an eye in automobile, carriage, car springs and the like, with which I am familiar, it has heretofore been the practice to employ a number of distinct operations to produce a complete eye, and the object of the present invention is to reduce the number of said operations, so that in my novel machine, I am enabled to produce the complete eye in a spring blank, in but two operations which comprises first the formation of a half turn and the scarfing or beveling of the end of the spring blank and second the effecting of the complete turn at said end to produce the complete eye, the latter being further finished if desired, by the insertion of a pin or former therein.

In the machines aforesaid of the prior art, the scarf was made the same for all sizes of eyes, but in my novel machine, I am enabled by means of interchangeable tools or scarfing dies to cut the scarf at definite or certain predetermined lengths, according to requirements, corresponding to the desired radius of the inside of the eye, whereby the scarf is made proportionately to each size of eye, so as to produce in the inner circumference of the finished eye, a true circle throughout.

Furthermore, there is in my present invention, less tendency for the outer surface of the eye to concave during the turning or bending of the metal, since whatever irregularity may tend to exist at that point is eliminated by my novel device.

To the above ends, my invention consists of a novel construction of a machine for expeditiously and effectively forming in the ends of a spring plate or blank, an eye, provision being made for giving an initial bend or half turn to the end of the heated blank, while the latter is properly positioned and effectively clamped with respect to the initial bending die which produces said half turn, next scarfing the initially bent end of said blank, after which said initially bent and scarfed end of said blank is subjected to the action of a finishing die, whereby the finished eye is formed in said blank automatically and expeditiously, the finished products being uniform in appearance, and the number of the steps of the operations heretofore employed, being reduced and simplified.

My invention in its broad aspects, further comprises a novel construction and collocation of clamping dies for a spring blank, an initial bending die for giving a half turn to the end of said blank, a scarfing die movable at an angle to said initial bending die, for scarfing the end of the initially bent blank, another set of clamping dies, and a finishing die for completing the eye in the initially bent and scarfed blank, in conjunction with novel coacting mechanism for effecting the proper actuation and timing of said dies.

It further consists of a novel construction of clamping dies, an initial bending die and a scarfing die, which latter is adapted to be actuated so as to scarf the end of the initially bent blank in conjunction with novel mechanism for effecting the actuation of said dies at the proper periods.

It further consists of a novel construction of clamping dies, and a finishing die adapted to coöperate therewith in conjunction with novel mechanism for effecting the actuation of said dies at the proper periods.

It further consists of a novel construction of a vertically movable cylindrical finishing pin adapted to finish the eye of the finished blank, which can be thrown into and out of operation at the will of the operator, according to requirements.

It further consists of the novel construction of clamping dies for holding the initially bent and scarfed blank and novel mechanism for actuating them in conjunction with a novel finishing die, means being provided for further finishing the eye while engaged by said clamping dies by forcing into said eye, a vertically movable cylindrical finishing pin, which can be thrown into and out of operation at the will of the operator.

For the purpose of illustrating my invention, I have shown in the accompanying drawings, forms thereof which are at present preferred by me, since they will give in practice satisfactory and reliable results.

It is to be understood that the various instrumentalities of which my invention consists can be variously arranged and organized and that my invention is not limited to the precise arrangement and organization of these instrumentalities as herein shown and described.

Figure 1 represents a top plan view of a machine for forming eyes of springs embodying my invention, certain of the parts being removed for the sake of clearness of illustration.

Fig. 2 represents a side view of the machine, the main driving shaft being shown in section.

Fig. 3 represents in side elevation, the opposite side of the machine from that seen in Fig. 2, certain parts of the construction being removed for the sake of clearness of illustration.

Fig. 4 represents a section on line 4—4 of Fig. 1.

Fig. 5 represents a section on line 5—5 of Fig. 1.

Fig. 6 represents a section on line 6—6 of Fig. 2.

Fig. 7 represents a section on line 7—7 of Fig. 6.

Fig. 8 represents in perspective, a portion of the blank from which the spring is formed and before it is bent.

Fig. 9 represents in perspective, the spring blank as it appears after the first operation has been completed.

Fig. 10 represents in perspective, a portion of the spring as it appears after the second or final operation is completed.

Fig. 11 represents diagrammatically, the relation of the spring and the dies for forming the first bending operation.

Fig. 12 represents diagrammatically, the arrangement of the spring blanks and the dies for effecting the other stages of the operation.

Fig. 13 represents a section on line 13—13 Fig. 3.

Similar numerals of reference indicate corresponding parts in the figures.

Referring to the drawings:—

1 designates a supporting framework of any desired or conventional construction and which carries at its upper end a table 2, which serves as a support for the operating parts of the machine.

3 designates the main driving shaft which has mounted thereon a pulley or fly wheel 4, which is adapted to be connected with any desired source of power either electrical or otherwise. The driving shaft 3 is rotatably mounted in the journals 5 carried by the table 2. The pulley or fly-wheel 4 is loosely mounted on the shaft 3 and its operative connection with the driving shaft 3 is controlled by means of a treadle 6, which is fulcrumed at its rear end as at 7 to the frame work 1, said treadle operating any suitable form of clutch mechanism, adapted to cause the main shaft 3 to rotate in unison with or independently of the fly wheel. I have shown one form of such clutch mechanism in Figs. 1 and 2, which I will describe generally, although it will be understood that other forms of such clutch mechanism may be employed.

The table 2, see Fig. 2, has secured to it a depending bracket 8, which at its lower end is provided with the laterally extending flange 9, through which extends a link 10, the lower end of which is pivotally connected at 11 with the treadle 6. The upper end of the link is pivotally connected at 12 to an elbow lever 13, which is fulcrumed at 14 on the table 2. The rod of the link 10 is threaded and provided with a plurality of adjusting nuts 15, one of which serves as a lock nut to control the tension of the spring 16, one end of which abuts against the flange 9, while the other end thereof abuts against one of the nuts 15, said spring encircling the rod of the link 10. The rear face of the upper arm of the elbow lever 13 is curved and adapted normally to pass into a slot 17 in a collar 18 fixed in any desired manner to the shaft 3. Laterally movable in the collar 18 so as to move across the wall of the slot 17, is a spring-pressed locking plunger 19, which has a slot or recess 20 into which the upper end of the elbow lever 13 extends to retain the locking plunger in inoperative position. When, however, the treadle 6 is depressed, the elbow lever 13 will be rocked on its fulcrum 14 and its upper end will be moved out of engagement with the locking plunger, whereupon the spring of the locking plunger will cause it to pass into and interlock with the hub 21 of the pulley or fly-wheel 4, which is loosely mounted on the driving shaft 3, so that the pulley or fly-wheel 4 will then be operatively connected with the shaft 3, so that the shaft 3 will begin to revolve. As the above described clutch mechanism forms no part *per se* of my invention, I deem it unnecessary to describe the same with great particularity.

The main driving shaft 3 has at one end secured to it, the cam 22 having a portion of its periphery cut away, as indicated at 23 and 24, Figs. 1 and 3, such cut away portions being suitably beveled in order to coöperate with a removable wear plate 25 removably connected to an end of a rock bar 26, which is fulcrumed at 27 on the table 2. The cam 22 has a portion of its periphery, as at 28, see Fig. 3, of greater diameter in order to coöperate with a tension block 29, the face of which is curved to conform to the face of the periphery 28 of the cam, said block 29 being secured in its adjusted position by means of the set screws 30 and 31, which serve to retain it in its adjusted position, so that if the momentum of the machine should cause the shaft to continue to revolve momentarily when the operator removes his foot from the treadle 6, the engagement of the periphery 28 of the cam with the tension block 29 would cause the moving parts to be arrested or assume such position that the clamping jaws hereinafter referred to would be in open position.

32 designates one of the movable clamping jaws, best seen in Figs. 1, 3, 5, 11 and 12, which is slotted as at 33 in order to permit the rock bar 26 to pass through it. The movable jaw 32 is fixedly connected with the rock bar 26 by means of a set screw 34 in threaded engagement with the movable jaw and having its forward end contacting against the rock bar 26, a lock nut 35 being provided to maintain the set screw 34 in its adjusted position.

The forward end of the rock bar 26 has secured to it a depending arm 36, see Fig. 3, having passing laterally through it a rod 37, see Fig. 1, provided at its outer end with a nut 38. The rod 37 passes loosely through a sleeve bushing 39, which is in threaded engagement with the arm 36. The rod 37 has also fixed to it a collar 40 between which and the sleeve bushing 39 is interposed a spring 41 serving as a tension device for the rod 37. The rod 37 at its free end terminates in a split collar. The forward end of the rod 37 is apertured to receive a pin 42 and is also so split so that the pin 42 can be clamped with respect to it by means of a fastening device 43.

The pin 42 is secured to one end of an arm 44, see Figs. 1 and 2, which at its other end is provided with a rearwardly extending sleeve 45. The sleeve 45 has fixed to it an upwardly extending rock arm 46 to which is pivotally connected one end of a link 47, the other end of said link being pivotally connected to the other movable clamping jaw 48, see Figs. 1, 5, 11 and 12.

It will thus be seen that upon the rocking of the rock bar 26 by the cam 22, the movable clamping jaws 32 and 48 will be moved toward each other, at the proper intervals.

The table 2, see Figs. 5, 11 and 12, is provided with an upward extension 49 on opposite sides of which are respectively positioned the fixed dies 50 and 51. The fixed die 51 is angularly recessed at its top as at 52, see Fig. 5, in order to receive the downwardly deflected portion of a clamping plate 53, which is fixed in position by means of a fastening device 54. The clamping plate 53 is provided with a set screw 55, which is in threaded engagement with it and engages the fixed die block 50 to secure it in position, as will be understood by reference to Fig. 5.

The block or fixed die 50 has also secured to its side face by means of fastening devices 56, a die 57, whose extremity is rounded as indicated at 58, see more particularly Figs. 11 and 12. The die block 50 is provided at its inner end with a curved recessed portion 59, which coacts with the working face 92 of the finishing die 89 to be hereafter referred to.

Referring now more particularly to Figs. 1 and 4, I will first describe the manner in which the first movable die is operated to form the first operation on the blank. The main driving shaft 3, see Fig. 4, is provided with an eccentric 60 on which is mounted an eccentric strap having the connecting rod 61, which is pivotally connected in any suitable manner to a cross-head 62 guided in the table 2. A replaceable wear plate 63 is preferably employed, the cross-head 62 carrying at its upper end a rack bar 64 with which a mutilated pinion 65 is geared, said pinion 65 being fixed to an oscillating or rocking shaft 66 journaled on the table 2.

The shaft 66 at one end has connected with it a disk 67 to which is secured an arm 68, which latter carries at its lower end a roller 69, see Fig. 2, which latter moves in the path of the arm 70 provided with the juxtaposed curved or cam faces 71 and 72. The arm 70 at its lower end is fixed to a gear segment 73 mounted on a stud shaft 74 carried by the table 2, said gear segment 73 meshing with a gear 75 mounted on a shaft 76 suitably journaled on the table 2. The shaft 76 has fixed to it one end of an arm 77, to the end of which is pivotally connected one end of a link 78, the opposite end of said link being pivotally connected with the slide 79.

The slide 79 is recessed to receive the movable die 80 which performs the first step in the bending of the spring plate or blank 81, to a half turn, see Figs. 11 and 12, the extremity of said blank initially appearing as seen in Fig. 8.

The front or forward face of the movable die 80 curves outwardly, as indicated at 82, while the side face contiguous to the blank during the bending operation, is cut away as indicated at 83 in order to conform to the thickness of the spring blank, and to properly effect the initial bending operation. It will thus be seen that during the initial forward movement of the cross head 62, the end of the spring blank will be initially bent to a half turn.

As the cross head 62 moves forwardly, it moves with it the scarfing die 84, which is secured to the cross-head 62 by means of fastening devices 86. The clamping plate 85 is provided with clamping screws 87, see Fig. 1, which serves to retain the scarfing die 84 in fixed position with respect to the cross head 62. The parts are timed in such a manner that as soon as the movable die 80 completes its forward movement, or has moved from the position seen in Fig. 11 to the position seen in Fig. 12, the scarfing die 84 advances from the position seen in Fig. 11 into that seen in Fig. 12, and the free end of the spring plate or blank after being initially bent is scarfed, or beveled as indicated at 88, see more particularly Fig. 9.

It will be understood that after the completion of the operation just described, the spring which has thus been initially bent to a half turn and scarfed is manually removed and placed between the movable clamping jaw 32 and the die block 50, as seen in dotted lines at the left of Fig. 11.

The next operation is that of the finishing die 89, which will now be described.

The cross head 62 has also mounted in it, a finishing die 89 which is secured in position by means of a clamping screw 90, see Fig. 1, the clamping screw 90 being carried by the clamping plate 85. The operative end of the finishing die 89 is provided with a semi-cylindrical working face 91 and with a forward extension 92, so that when said finishing die 89 moves forwardly and acts upon the half turned end of the spring plate or blank clamped between the movable clamping jaw 32 and the die block 50, a completed eye 93 will be formed at the end of the spring, as will be understood by reference to Figs. 10 and 12. It will be understood from Fig. 1, that the dies 84 and 89 move forward and back toward and away from the operator, while the initial bending die moves at a right angle to the line of movement of said dies, 84 and 89.

In some cases where it may be desirable to impart a better finish to the eye 93, although it is not necessary in all cases, I employ the following construction:—

The shaft 66 carries at one end a disk 94, see Figs. 1, 3 and 5, which has connected to it near its periphery a bent arm 95, the free end of which is connected to one end of a bell crank lever 96, which is fulcrumed on a standard 97 rising from the table 2. The upper end of the bell crank lever 96 has connected to it, one end of a link 98, the other end of which is pivotally mounted on a pin 99 carried by a vertically reciprocating slide bar 100. The slide bar 100 is provided with a laterally extending aperture 101, adapted to receive a laterally movable pin 102, which is carried by a handle 103, which is fulcrumed at 104 to a sliding head 105. A spring 106, see Fig. 1, is provided which is positioned between the sliding head 105 and the handle 103 and tends normally to maintain the locking pin 102 out of engagement with the walls of the aperture 101. The lower end of the vertically reciprocable head 105 is provided with a laterally extending guide 107 having converging upper and lower walls, so that the tool head 108 can be laterally adjusted thereon, see Figs. 5, 6 and 7. The tool head 108 is fixed in its adjusted position by means of fastening devices 109, see Fig. 6. The tool carrying head 108 has opening through its front face, a slot 110, which receives a tool carrier or head 111, which is provided with an overhanging top flange 112 and a lateral bottom flange 113, so that said tool carrying head 111 is permitted a limited relative movement with respect to the head 108. The forward end of the slot 110 is closed by means of a bar 114 secured in position by means of fastening devices 115.

116 designates a former or finishing tool, or pin see Fig. 7, which is provided at its upper end with a reduced portion 7, which is secured in place in the tool carrier 111 by means of a cotter pin 118 or its equivalent. The lower end of the cylindrical finishing die or finishing tool 116 is formed in the shape of a truncated cone having the converging walls 119 in order that it may center itself with respect to the eye 93 when the finishing tool 116 moves downwardly. The slide bar 105 has secured to it a bent arm 120 through the top of which passes a threaded rod 121, which is secured to it by means of nuts 122. The rod 121 is also provided with an adjusting nut 123 between which and the stationary portion of the machine is interposed a spring 124, which normally tends to retain the sliding head 105 in its raised position.

The rock bar 26 has secured to it a plate 125, see Figs. 3 and 13, through which pass the threaded rods 126, which are fixed in the table 2 at one end, their outer ends passing freely through the plate 25 and being provided with nuts 127. Between the plate 125 and the table 2 are interposed spring 128 the tendency of which is to move the forward end of the rock bar 26 outwardly so that the plate 25 will always be in engagement with or properly positioned in the path of the cam 22, see Fig. 3.

When it is desired to adjust the position of the dies by hand, such adjustment can be accomplished by actuating the handle 129, which is connected to the shaft 76.

I also provide a gage for holding the springs in proper position to be clamped in the machine. The table 2 has secured to it at its forward end a bracket 130, and in threaded engagement with this bracket is a forwardly projecting polygonally shaped guide bar 131 on which is mounted a guide bracket 132, which is secured in its adjusted position by means of a set screw 133.

This guide bracket is provided with guide ways 134, in which are longitudinally slidable the blocks 135 having a threaded opening to receive the threaded rods 136, which are connected to their respective handles 137, it being understood that said blocks 135 aline with the grooves 138 and 139 seen at the left of Fig. 1 and in Figs. 11 and 12, so that the spring blanks inserted in said grooves for the respective bending operations, will have their ends properly positioned at all times with respect to the initial bending die 80, the scarfing die 84, and the finishing die 89.

140 designates a plate secured to the table 2 and serving as a cover for certain of the moving parts.

The operation is as follows:—

The operator first adjusts the guide blocks 135 into the desired position, and the spring blanks 81, having their ends, which are to be bent, heated are placed in the slots or recesses 138 and 139 seen in Figs. 1, 11 and 12, the rear ends of said blanks engaging said guide blocks, so as to properly position their forward ends to be bent with respect to the clamping and bending dies.

Upon the depression of the treadle 6, the main shaft 3 is caused to revolve, whereby the clamping of the spring blanks in position is effected so that they will be firmly held during the initial bending, scarfing and finishing operations.

The rotation of the main shaft 3, rotates the cam 22, seen in Figs. 1 and 3, whereby the rock bar 26 is rocked on its fulcrum 27, which through the intermediate connections causes the movable clamping jaws 32 and 48 to move toward each other and toward the stationary coacting jaws 50 and 51 respectively, and the dwell in the cam 22 causes the blanks to be clamped rigidly during the bending operations, and at the conclusion of the latter the cam 22 causes said movable clamping jaws 32 and 48 to move outwardly and thereby releasing the spring blanks, so that they can be removed from the machine, the springs 128, seen in Fig. 13, causing the rock bar 26, to properly position itself at all times, with respect to its cam 22.

Referring now to Fig. 4, it will be seen that the rotation of the main shaft 3 and the eccentric 60 will cause the reciprocation of the cross head 62, whereby a reciprocating movement is imparted to the rack 64, which actuates or oscillates the mutilated pinion 65 and imparts a rocking motion to the rock shaft 66. Through the medium of the disk 67, the arm 68 and the roller 69, seen in Fig. 2, the arm 70 is rocked thereby rocking the gear 73, and the intermeshing pinion 75, which effects the rotation or oscillation of the shaft 76, which causes the arm 77, which is connected to the link 78 to the slide 79, on which is mounted the initial bending die 80. During this period the die 80 has moved from the position seen in Fig. 11 to that seen in Fig. 12, and the initial bending of the end of the blank 81 to form a half turn around the curved end 58 of the die 57 is thus effected. It will be understood that during the forward movement of the cross head 62, which has caused the initial bending operation, said cross head has advanced the scarfing die 84, from about the position seen in Fig. 1 to its position, seen in Fig. 11 and a continued forward movement of said cross head brings said scarfing die into the position seen in Fig. 12, so that the end of the spring blank now appears as seen in Fig. 9. When the operator removes his foot from the treadle 6, at the proper period, the wear plate 25 becomes disengaged from the cam 22, and the movable clamping jaws 32 and 48 move away from their fixed jaws to release the spring blanks which can now be removed.

When the high face 28 of the cam 22 comes into engagement with the friction block 29, a braking action is exerted on the moving parts and the main driving shaft 3, so that the machine will stop, when the movable clamping jaws 32 and 48 are open or in about the position seen in Fig. 5, the position of the braking element 29 being now as shown at the left of Fig. 3. The initially bent and scarfed blank, seen in Fig. 9, is now removed from the slot 139 and placed in the proper position in the slot 138.

The operator again depresses the treadle 6, which causes the rotation of the main shaft 3 and effects the actuation of the cross head 62 and its adjuncts as already described, it being understood that the movable jaw 32 has moved from the position seen in Fig. 11 to the position seen in Fig. 12 to clamp the initially bent and scarfed blank, shown dotted in the slot 138 at the left of Fig. 11.

The continued forward movement of the cross head 62 advances the finishing die 89, which it carries from the position seen in Fig. 11 to the position seen in Fig. 12, and the working faces 91 and 92 of the die 89, in conjunction with the curved recess 59 of the fixed die 50, complete the formation of the eye 93, the finished article now appearing as seen in Fig. 10, and in the left hand portion of Fig. 12. When it is desired to further finish or produce a better finish for the eye 93, the operator actuates the handle 103, and causes the pin 102, seen in Fig. 3, to interlock with its seat or hole 101, so that the parts 100 and 105 will reciprocate vertically as a unit, which causes the tool carrying head 111 to reciprocate vertically carrying with it the cylindrical former or pin 116, which during its downward movement centers itself in the eye 93, and thus further finishes the same. The former being loosely mounted on its head 111, has a slight play at its lower end, so that it readily centers itself with respect to the eye 93, during its descent thereinto.

It will be understood that the slide bar 100 is reciprocated vertically by means of link 98, elbow lever 96 and the arm 95, eccentrically connected to the disk 94, which is fast on the rock shaft 66, as will be understood from Figs. 3 and 5, said slide bar moving freely or idling at all times except when the pin 102 is interlocked with its seat 101, whereupon the parts 100 and 105 and their adjuncts move as a unit.

The spring 124 accelerates the upward movement of these parts, as will be understood from Fig. 3.

It will be understood from Figs. 11 and 12 that my novel machine is very expeditious in its operation, since the two blanks can be simultaneously operated on by the various dies, since while one blank is being initially operated on, the other blank is being finished, so that a greatly increased output is obtained over prior machines.

By my novel construction of the cross head 62, and the manner of securing the scarfing die or tool 84 therein, I am enabled to employ interchangeable tools, for cutting the scarf or bevel 88, seen in Fig. 8, which can be cut at different or predetermined lengths, as may be desired or required, corresponding to the radius of the inside of the eye.

Thus, I am enabled to make the scarf, as 88, proportionate to each size of the eye, and thus produce an inner circumference or periphery in the finished eyes of different sizes, which will be a true circle throughout.

I have also found that in my present construction, there is less tendency for the outer surface of the eye to be concaved during the operation of bending or turning the metal, since whatever irregularity is liable to exist at that point is eliminated by my novel devices.

I desire to call especial attention to the fact that I employ but two dieing operations, the first making the half turn, and the second completing the eye, as will be understood from Figs. 11 and 12, and that I make provision by means of interchangeable tools for cutting the scarf at different lengths according to different sized eyes.

It will now be apparent that I have devised a new and useful machine for forming spring eyes which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In an eye-making machine, means for producing a complete eye in two operations, comprising means for forming a half turn on the end of the blank and cutting a scarf thereon, and means for subsequently making a complete turn in said blank, thereby forming and finishing the complete eye.

2. In an eye-making machine, means for producing a complete eye in two operations, comprising means for forming a half turn on the end of the blank and cutting a scarf thereon, means for subsequently making a complete turn at the end of said blank, thereby forming the complete eye and means for inserting and withdrawing a pin with respect to said eye to finish the latter.

3. In an eye-making machine, means for clamping the article to be bent, a die for initially bending the end of said article to a half turn, means for actuating said die at a right angle to the article to be bent, a scarf forming die movable at an angle to said initial bending die and means for actuating said scarf forming die.

4. In a device of the character stated, means for clamping a spring blank in fixed position, means for initially giving a half turn to the end of said blank, and interchangeable means for scarfing said bent end, said interchangeable scarfing means moving at an angle to said bending means.

5. In a device of the character stated, means for clamping a spring blank in fixed position, means for initially bending the end of said blank to give it a half turn, means for scarfing the extremity of said bent end, and means for further giving a complete turn to said scarfed and bent end so as to form a complete eye in said blank.

6. In a device of the character stated, means for clamping a plurality of spring blanks in fixed position, means for initially bending and scarfing one of said blanks and means for simultaneously finishing the formation of the partly finished eye in the other of said blanks.

7. In a device of the character stated, means for clamping a plurality of spring blanks in fixed position, one of said blanks having a straight end and the other of said blanks having its end initially bent to form a half turn, scarfing means for initially bending and scarfing the first of said blanks and means for simultaneously finishing the formation of the eye in said second blank, said scarfing and finishing means moving in the same direction.

8. In a device of the character stated, a main driving shaft, a cross head actuated thereby, an eye finishing die mounted in said cross head, an interchangeable or removable scarfing tool also mounted in said cross head, and means for holding said die and tool in position in said cross head.

9. In a device of the character stated, a cross head, means for actuating it, a movable eye finishing die 89, having the working faces 91 and 92, a stationary eye finishing die having the curved working face 59 and a removable scarfing tool also mounted in said cross head, and movable in unison with said finishing die.

10. In an eye making machine, means for producing a complete eye in two operations, comprising a stationary die having a curved edge, a movable die having means for forming a half turn on the end of the blank, a tool for cutting a scarf thereon, and means for subsequently making a complete turn in said blank, thereby forming and finishing the complete eye.

11. In an eye making machine, means for producing a complete eye in two operations, comprising a stationary die having a curved edge, a movable die having a curved recess, coöperating with said edge for forming a half turn on the end of the blank, means for cutting a scarf on said blank, means for subsequently making a complete turn at the end of said blank thereby forming the complete eye and means for inserting and withdrawing a pin with respect to said eye to finish the latter.

12. In a device of the character stated, means for clamping the article to be bent, a stationary die having a rounded edge, a movable die having a curved recess coacting with said rounded edge for initially bending the end of said article to a half turn, means for actuating said movable die at a right angle to the article to be bent, a scarf forming die, movable at an angle to said initial bending die and means for actuating said scarf forming die.

13. In a device of the character stated, means for clamping a spring blank in fixed position, a stationary die having a rounded edge, means coöperating therewith for initially giving a half turn to the end of said blank, and means for scarfing said bent end, said scarfing means moving at an angle to said bending means, and being adapted to move past said rounded edge in the scarfing operation.

14. In a device of the character stated, means for clamping a spring blank in fixed position, a stationary die having a rounded edge, a movable die having a curved recess coacting with said edge for initially bending the end of said blank to a half turn, removable means for scarfing the extremity of said bent end, said scarfing means moving at an angle to said movable die, and means for further giving a complete turn to said scarfed and bent end so as to form a complete eye in said blank.

15. In a device of the character stated, means for clamping a plurality of spring blanks in fixed position, means for initially bending and scarfing one of said blanks and means for simultaneously finishing the formation of the partly finished eye in the other of said blanks, said finishing means and scarfing means moving in the same direction and at an angle to said initial bending means.

16. In a device of the character stated, means for clamping a plurality of spring blanks in fixed position, one of said blanks having a straight end and the other of said blanks having its end initially bent to form a half turn, and movable means for initially bending and scarfing the first of said blanks, means for simultaneously finishing the formation of the eye in said second blank, said scarfing and finishing means being actuated in the same direction, and means for advancing and retracting a forming pin with respect to the completed eye.

17. In a device of the character stated, a main driving shaft, a cross head actuated thereby, a movable eye finishing die carried by said cross head, a removable scarfing tool also carried by said cross head, a stationary eye finishing die in alinement with said movable eye finishing die, a movable clamping jaw coacting with said stationary die, another stationary die having a rounded edge, a movable clamping jaw coacting with said last mentioned stationary die, said scarfing tool being adapted to be moved past said rounded edge, a movable die having a curved recess therein, and coacting with said rounded edge for giving an initial half turn to the article to be bent, and connections from said driving shaft to said movable clamping jaws and movable die for actuating them.

18. In a device of the character stated, a main driving shaft, a cross head actuated thereby, a movable eye finishing die carried by said cross head, a removable scarfing tool also carried by said cross head, a stationary eye finishing die in alinement with said movable eye finishing die, a movable clamping jaw coacting with said stationary die, another stationary die having a rounded edge, a movable clamping jaw coacting with said last mentioned stationary die, said scarfing tool being adapted to be moved past said rounded edge, a movable die having a curved recess therein, and co-acting with said rounded edge for giving an initial half turn to the article to be bent, and connections from said driving shaft to said movable clamping jaws and movable die for actuating them, in combination with a reciprocable eye finishing pin adapted to aline with the opening between the juxtaposed abutting faces of said stationary and movable finishing dies and means for actuating said pin.

19. In a device of the character stated, a main driving shaft, a cross head actuated thereby, a movable eye finishing die carried by said cross head, a removable scarfing tool also carried by said cross head, a stationary eye finishing die in alinement with said movable eye finishing die, a movable clamping jaw coacting with said stationary die, another stationary die having a rounded edge, a movable clamping jaw co-acting with said last mentioned stationary die, said scarfing tool being adapted to be moved past said rounded edge, a movable die having a curved recess therein and coacting with said rounded edge for giving an initial half turn to the article to be bent, and connections from said driving shaft to said movable clamping jaws and movable die for actuating them, in combination with a reciprocable eye finishing pin, means for reciprocating said pin and means for temporarily rendering said pin inoperative.

20. In a device of the character stated, a framework having longitudinally extending recesses therein, for the reception of the blanks to be bent, a guide bar projecting forwardly from said framework, a plurality of adjustable guide blocks mounted on said guide bar, said guide blocks being located in alinement with said recesses, and means for adjusting said guide blocks toward and away from said framework.

21. In a device of the character stated, a framework having longitudinally extending recesses therein for the reception of the blanks to be bent, a guide bar projecting forwardly from said framework, a plurality of adjustable guide blocks mounted on said guide bar, said guide blocks being located in alinement with said recesses, a stationary member located intermediately of said longitudinally extending recesses, fixed dies on each side of said member, and clamping jaws juxtaposed to said stationary dies, said recesses being formed between said dies and clamping jaws.

22. In a device of the character stated, a framework having longitudinally extending recesses therein for the reception of the blanks to be bent, a guide bar projecting forwardly from said framework and carrying a plurality of adjustable guide blocks, said guide blocks being located in alinement with said recesses, stationary dies forming one wall of said recesses, movable clamping jaws forming the other wall of said recesses, and means for opening and closing said clamping jaws.

WILLIAM EVANS.

Witnesses:
JOHN B. WALLACE,
WILLIAM R. EVANS.